J. M. TURRENTINE.
HARVESTER FOR PEA VINES.
APPLICATION FILED DEC. 6, 1912.
1,057,688.
Patented Apr. 1, 1913.
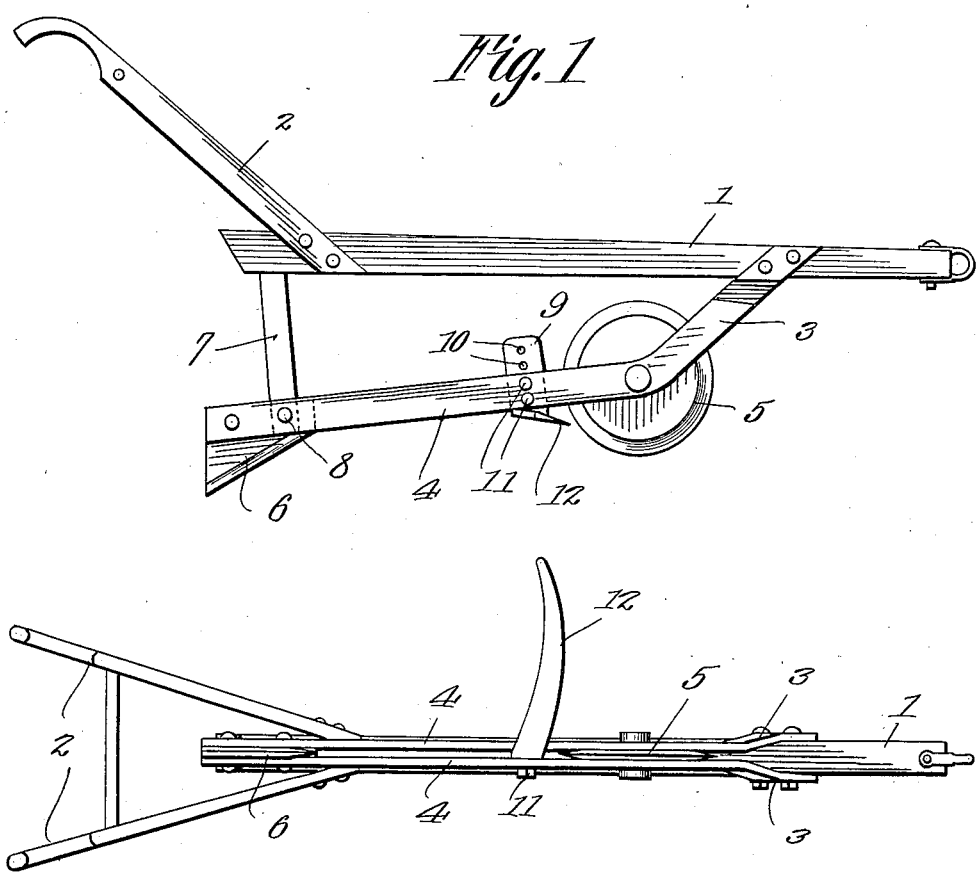
J. M. Turrentine
Inventor,
Witnesses
by C. A. Snow & Co.
Attorneys.

UNITED STATES PATENT OFFICE.

JAMES M. TURRENTINE, OF PICKTON, TEXAS.

HARVESTER FOR PEA-VINES.

1,057,688.  Specification of Letters Patent.  Patented Apr. 1, 1913.

Application filed December 6, 1912. Serial No. 735,308.

*To all whom it may concern:*

Be it known that I, JAMES M. TURRENTINE, a citizen of the United States, residing at Pickton, in the county of Hopkins and State of Texas, have invented a new and useful Harvester for Pea-Vines, of which the following is a specification.

This invention relates to harvesters for pea vines.

In some localities it is customary to raise pea vines for use as hay but considerable difficulty has always been experienced in properly harvesting them.

One of the objects of the present invention is to provide a simple but efficient form of harvester which will operate to cut the vines so that they can be collected readily in the same manner as ordinary hay, said mechanism operating to cut downwardly on those vines extending across the path of the machine and to at the same time sever the vines adjacent the path of the machine, a laterally extending scythe being provided for this last mentioned purpose.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of the machine. Fig. 2 is a bottom plan view thereof.

Referring to the figures by characters of reference 1 designates a beam having handles 2 extending upwardly and rearwardly therefrom. Secured to the sides of the beam adjacent the front end thereof and extending downwardly and rearwardly therefrom, are side strips 3 preferably formed of metal and which merge into parallel rearwardly extending portions 4. A disk cutter 5 is arranged below the beam 1 and between the lower ends of the portions 3, this disk being adapted to both support the front portion of the beam 1 and to act as a cutter for severing vines in the path of the disk. A substantially triangular colter 6 is interposed between the rear end portions of the strips 4 and is adapted to cut into the soil and thus prevent side draft of the rear end portion of the machine. A standard 7 may be extended downwardly from the rear end portion of beam 1 and fastened between the strips 4 by one of the bolts 8 employed for securing the colter 6 in position. Extending upwardly between the strips 4 close to and back of the disk 5 is a plate 9 having an upwardly extending series of apertures 10, certain of which are adapted to receive a pair of fastening bolts 11 or the like. This plate has a laterally extending scythe 12 thereon which is preferably curved as shown so as to produce a shearing cut upon the vines with which it contacts.

It will be apparent that when the machine is drawn forward the disk 5 will cut through the vines in the path thereof while the scythe 12 will shear off the vines located at one side of the path of the disk. The colter 6 will of course hold the scythe constantly at the proper angle to the path of movement. As the plate 9 is adjustable vertically, the scythe can be easily arranged so as to travel at any desired distance from the surface of the ground.

Importance is attached to the fact that the device herein described is very simple and durable in construction and will efficiently operate for the purpose intended. The various parts thereof will not become readily displaced and all of them can be easily repaired in the event of injury thereto.

What is claimed is:—

1. A machine of the class described including a disk cutter constituting a supporting wheel, a laterally extending scythe back of and adapted to travel with the cutter, and means coöperating with the disk for maintaining the scythe at a predetermined angle to the path of movement of the disk.

2. A machine of the class described including a beam, downwardly and rearwardly extending strips fixedly connected thereto, a cutting disk journaled between the strips and constituting a supporting wheel, a vertically adjustable member between the strips, and a laterally extending scythe carried by said member.

3. A machine of the class described including a beam, downwardly and rearwardly extending strips fixedly connected thereto, a cutting disk journaled between the strips and constituting a supporting wheel, a laterally extending scythe connected to the strips, and a colter extending downwardly from said strips and back of the scythe.

4. A machine of the class described including a beam, downwardly and rearwardly extending strips fixedly connected thereto, a cutting disk journaled between the strips and constituting a supporting wheel, a vertically adjustable member between the strips, a laterally extending scythe carried by the said member, and a colter secured between and extending downwardly from the strips back of the adjustable member.

In testimony that I claim the foregoing as my own, I have hereto affixed my signature in the presence of two witnesses.

JAMES M. TURRENTINE.

Witnesses:
E. C. McCLUNG,
WM. P. GIBSON.

Copies of this patent may be obtained for five cents each, by addressing the "Commissioner of Patents, Washington, D. C."